UNITED STATES PATENT OFFICE.

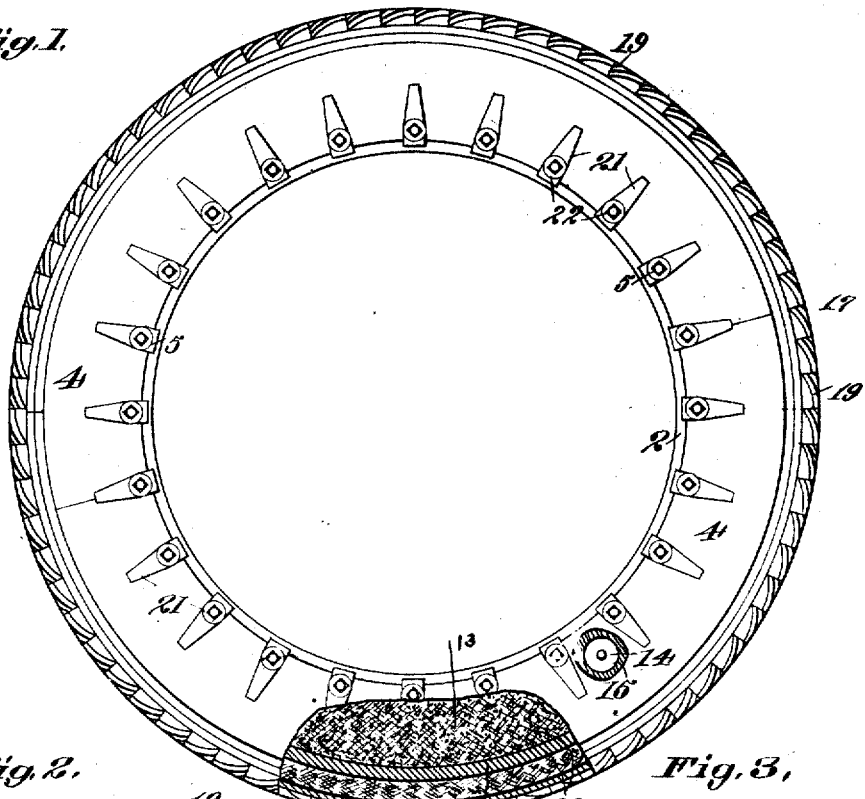

JAMES E. KNAUSS AND CHARLES PHINNEY, OF HEALDSBURG, CALIFORNIA.

AUTOMOBILE-TIRE.

1,015,690. Specification of Letters Patent. Patented Jan. 23, 1912.

Application filed November 7, 1910. Serial No. 590,988.

*To all whom it may concern:*

Be it known that we, JAMES E. KNAUSS and CHARLES PHINNEY, both citizens of the United States, residing at Healdsburg, in the county of Sonoma and State of California, have invented new and useful Improvements in Automobile-Tires, of which the following is a specification.

Our invention relates to automobile tires and particularly to resilient tires.

The object of this invention is to provide a resilient tire having a metallic tread and rim built up of sections, and which is movable relative the felly of the wheel; and to provide resilient members for normally sustaining the rim and tire when under pressure and allowing a cushion-like action between said members when the tire is subjected to uneven resistances and when the wheel connected to the felly is subjected to an independent motion; and to provide a tire structure having a metallic tread so designed and constructed as to eliminate as far as possible the skidding of the wheel and to deaden the noise of the metallic contact with the road surface.

The invention consists of the parts and construction and combination of parts as hereinafter more fully described and claimed having reference to the accompanying drawings, in which—

Figure 1 is a side elevation of the wheel broken away in parts. Fig. 2 is a transverse section across the tire and felly. Fig. 3 is a plan view of a fragment of the tire.

In the illustrated embodiment of our invention we employ a continuous annular felly member 2, to which may be connected in any suitable manner the spokes of the wheel. One side of the felly 2 is provided with an annular flange 3 of appropriate height which may be integrally formed therewith, or attached thereto in any appropriate manner. On the opposite side of the felly 2 is secured a sectional, removable flat ring or flange 4, here shown as being composed of two similar sections bolted as at 5, at numerous regular points to the felly of the wheel. Between the two flanges 3 and 4 is thus formed an annular space, preferably having a concaved bottom formed by the exterior perimeter of the felly 2, and at frequent intervals this perimeter is suitably recessed by concentric circular grooves 6, into which are adapted to seat a plurality of radially disposed resilient members 7 and 8, here shown as comprising concentric helical springs, the larger of which as 7 surrounds the inner smaller springs 8, and each are prevented against transverse motion by their seats 6. The purpose of these several springs is to support in a normally concentric relation to the felly 2 a suitably formed floatable rim 9 of substantially arched shaped cross-section, the inwardly extending flanges 10 of which are grooved on their outer surfaces as at 11, to receive a suitable packing strip, as an asbestos or other cord 12, which bears upon the parallel annular flanges 3 and 4. The relative extreme diameter of the felly 2 and the diameter of the inner edge of the flange 10 is such as to allow a reasonable amount of independent motion between these two members, due to the variations of resistance and pressure on the parts. The packing cord 12 serves the purpose of preventing the entrance of dust, water or other foreign matter from having access to the spring containing chamber between the rim and the felly, and in order to constantly keep these members lubricated, we fill or partly fill the chamber with graphite or other suitable substance as at 13.

For the purpose of preventing an excessive relative motion between the felly and the rim members, at suitable intervals around the flange 10 are secured or formed a number of small projections 14 of length sufficient to normally bottom in circular recesses or depressions 15 formed on the inner surface of the sectional flange 4. In the event of undue motion between these members or lugs 14 they will positively engage the circular wall of the depression 15, and prevent further motion in the direction of the circumference. The differential springs 7 and 8 are further insured against transverse dislocation or movement by means of a suitable securing device as rods 16 passed transversely through the felly of the wheel and through the lower coils of the several springs 7 and 8. The manifest purpose of making these springs of different sizes and different gage material, is to afford a differential action between them whereby heavier spring is made effective when the tire is subjected to heavy loads.

In order to facilitate the removing of the tire, the rim portion 9 may be made in a plurality of sections, in this instance shown as being two in number, and upon its external periphery is secured a number of detachable curved plates 17, forming removable and renewable treads adapted for ground running and which are secured upon the tire section 9 by means of appropriate bolts or screws 18. The tread sections 17 may be formed with or have appropriately secured upon their operative surface a number of grousers or rib 19, angularly disposed and having their inner ends cut so as to be parallel to the axis of rotation.

The exterior central portion of the tire 9 is concaved as at 20, and in the chamber formed between this concaved surface and the treads 17 may be inserted graphite or other suitable material for the purpose of deadening the sound generated by the contact of the metallic tread 17 on the roadway, and to form a soft bearing for the tread sections.

Suitable reinforcing devices as angular lugs or clips 21 may be fastened against the flange sections 4 by bolts 22 passing through the lugs, and screwing into the body of the felly. When the tire is subjected to heavy transverse strains as in skidding or turning corners, the flanges will be reinforced and supported by the outwardly extending portion of the toe braces.

It will be seen that by this construction and with a proper degree of compression. the normal weight of the car and load will be sustained by one set of the springs acting radially toward the center, from every direction, and any additional compression such' as will be caused by the movement of the car over irregular surfaces, will be resisted by the supplemental springs which will then add their elastic force to that of the main springs. The lugs 14 movable in the depressed circular chambers 15, in the sides of the flanges serve to resist thrusting strains, while allowing free movements between the outer rim and felly in planes transverse to the axis.

Having thus described our invention, what we claim and desire to secure by Letters Patent, is—

1. A tire comprising a continuous annular felly, a flange integrally formed upon one side of said felly, a sectional flange removably attached to the other side of the felly, a tread member transversely operable between said flanges, concentric resilient members yieldably supporting the tread upon the felly, and means for attaching the resilient members to the rim, said means comprising transversely extending bars passing through opposite ends of said resilient members.

2. A tire and annular felly, having an integral outwardly turned flange upon one side and a corresponding removable flange upon the opposite side, a rim and tread member having parallel, inwardly extending flanges substantially fitting between the felly flanges and having annular grooves or channels with packing rings forming joints between the felly flanges and the rim flanges, whereby the interior chamber is adapted to contain a plastic filling compound, resilient springs of different tension with means for securing their ends respectively to the exterior of the felly member and the interior of the rim member, and securing means comprising transversely extending bars passing through opposite ends of the resilient members.

3. A tire comprising a continuous, annular felly, having outwardly extending parallel flanges, one of which is integral with the felly and the other removable, reinforcements for the removable flange comprising radially disposed ribs having the outer ends contacting with the outer periphery of the flange and the inner ends flanged and bolted to the felly edge, a tread member comprising an arched rim with an annular, concaved peripheral channel, parallel flanges extending inwardly from the felly, the flanges having packing rings to form joints therewith, a resilient support between the felly and said rim, and fillings of plastic material between the tread member and the rim.

4. The combination in a wheel, of a continuous annular felly, outwardly extending flanges upon opposite sides of the felly, a sectional concave rim fitting between said flanges, resilient members and means by which they are fixed and supported between the rim and felly, a tread upon the rim, flexible packing rings between the rim and felly flanges, depressed chambers in the felly flanges, and lugs projecting from the rim into said chambers.

In testimony whereof we have hereunto set our hands in the presence of two subscribing witnesses.

JAMES E. KNAUSS.
CHARLES PHINNEY.

Witnesses:
W. J. McCLENDON,
F. R. HAIGH.